UNITED STATES PATENT OFFICE.

KARL SCHNITZSPAHN, OF OFFENBACH-ON-THE-MAIN, GERMANY, ASSIGNOR TO CORPORATION OF CHEMISCHE FABRIK GRIESHEIM ELEKTRON AT FRANKFORT-ON-THE-MAIN, GERMANY.

MONOAZO DYE FOR LAKES.

976,401.   Specification of Letters Patent.   Patented Nov. 22, 1910.

No Drawing.   Application filed July 13, 1910. Serial No. 571,698.

*To all whom it may concern:*

Be it known that I, KARL SCHNITZSPAHN, doctor of philosophy, chemist, a subject of the German Emperor, and resident of Offenbach-on-the-Main, in the Grand Duchy of Hesse, Germany, with the post-office address Obermainstrasse No. 81, have invented new and useful Improvements in a Monoazo Dye for Lakes, of which the following is a specification.

My invention relates to the manufacture of a monoazodyestuff, which is most valuable for preparing of pigment colors and can be obtained by combining the diazo compound of 2-naphthylamin-4.8-disulfonic acid with 2.3-oxynaphthoic acid. The pigment colors obtained from these dyestuffs give red, particularly bluish, shades of very great trueness against the action of oil and of light. The shades of the pigment colors obtained from these dyestuffs are more bluish than those of the pigment colors of dyestuffs, which are obtained from other β-naphthylamin sulfonic acids.

The following example will serve to illustrate the nature of my invention. The parts are by weight: 52,2 parts of the sodium salt of 2-naphthylamin-4:8-disulfonic acid are dissolved in 500 parts of water. This solution is cooled by addition of ice, 10,35 parts of sodium nitrite are added and the solution is poured in diluted hydrochloric acid, which corresponds to 67 parts of hydrochloric acid 20° Baumé. The diazo compound thus obtained is then poured into a cold solution of 30 parts of 2.3-oxynaphthoic acid in 700 parts of water and 30 parts of caustic soda lye 35° Baumé and mixed with 53 parts of sodium carbonate. After the combination is completed the mass is heated and the dyestuff is precipitated by addition of common salt. It forms in dry state a red-brown powder and is soluble in concentrated sulfuric acid with very bluishred color, in water with yellowish-red color. This solution is changed both by addition of caustic soda lye and by addition of hydrochloric acid in a bluish-red color.

The dyestuff is changed into the pigment colors in usual manner. The preparation of the dyestuff and the formation of the lake can be obtained naturally in one operation in usual methods.

Now what I claim and desire to secure by Letters Patent, is the following:

1. The process for the production of a monoazodyestuff specially valuable for preparing pigment colors consisting in the combination of the diazo compound of 2-naphthylamin-4:8-disulfonic acid with 2.3-oxynaphthoic acid.

2. As a new article, the dyestuff obtained by the combination of the diazo compound of 2-naphthylamin-4.8-disulfonic acid with 2.3-oxynaphthoic acid, which dyestuff forms in dry state a red-brown powder and is soluble in concentrated sulfuric acid with very bluish-red color and in water with yellowish-red color; the solution being changed both by addition of caustic soda lye and by addition of hydrochloric acid to a bluish-red color and the dyestuff capable of being transformed into very bluish-red pigment colors.

In testimony, that I claim the foregoing as my invention, I have signed my name in presence of two witnesses, this first day of July 1910.

KARL SCHNITZSPAHN.

Witnesses:
  KATHINKA PFEIFFER,
  HERMANN WERT.